United States Patent
Adachi (10) Patent No.: US 11,214,239 B2
(45) Date of Patent: Jan. 4, 2022

(54) DRIVING SUPPORT APPARATUS

(71) Applicant: TOYOTA JIDOSHA KABUSHIKI KAISHA, Toyota (JP)

(72) Inventor: Masahiko Adachi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 16/287,137

(22) Filed: Feb. 27, 2019

(65) Prior Publication Data
US 2019/0263378 A1    Aug. 29, 2019

(30) Foreign Application Priority Data
Feb. 28, 2018    (JP) .............................. JP2018-035212

(51) Int. Cl.
  *B60W 10/18*    (2012.01)
  *B60K 31/00*    (2006.01)

(52) U.S. Cl.
  CPC ..... *B60W 10/18* (2013.01); *B60K 2031/0016* (2013.01); *B60K 2031/0025* (2013.01);
  (Continued)

(58) Field of Classification Search
  CPC .......... G08G 1/00; G08G 1/0967; G08G 1/16; B60K 2031/00; B60K 2031/0016; B60K 2031/0025; B60K 2031/0033; B60K 2031/0091; B60W 10/18; B60W 2550/00; B60W 2550/20; B60W 2550/22; B60W 2550/30; B60W 2550/302; B60W 2550/304; B60W 2550/306; B60W 2550/308; B60W 2710/00; B60W 2710/18; B60W 2750/00; B60W 2750/30; B60W 2750/302; B60W 2750/306; B60W 2750/304; B60W 30/00; B60W 30/02;
  (Continued)

(56) References Cited

U.S. PATENT DOCUMENTS

2015/0105989 A1    4/2015   Lueke et al.
2016/0167650 A1*   6/2016   Clarke ............... B60K 31/0066
                                                       701/28
2016/0318490 A1*  11/2016   Ben Shalom ............. B60T 7/18

FOREIGN PATENT DOCUMENTS

JP    2009-1245 A     1/2009
JP    2010-280271 A   12/2010
JP    2016-501408 A   1/2016

* cited by examiner

*Primary Examiner* — Anthony R Jimenez
(74) *Attorney, Agent, or Firm* — Sughrue Mion, PLLC (57) ABSTRACT

A driving support apparatus is provided with: a recognizer configured to obtain information indicating a surrounding environment of a host vehicle, and configured to recognize a deceleration required target, which is a target that requires deceleration of the host vehicle; and a supporter configured to perform a driving support operation for supporting the deceleration of the host vehicle, on condition that the deceleration required target is recognized by the recognizer. If a recognition situation, which is recognized by said recognizer, of the deceleration required target that causes the driving support operation to be performed becomes uncertain while performing the driving support operation, said supporter is configured to maintain a preceding operating state of the driving support operation, which is an operating state immediately before the recognition situation becomes uncertain.

15 Claims, 4 Drawing Sheets

(52) U.S. Cl.
CPC ............... *B60K 2031/0033* (2013.01); *B60K 2031/0091* (2013.01)

(58) Field of Classification Search
CPC .... B60W 30/08; B60W 30/085; B60W 30/09; B60W 30/095; B60W 30/0953; B60W 30/0956; B60W 30/10; B60W 30/12; B60W 30/16; B60W 30/1622; B60W 30/17; G06T 1/00; B60T 7/00; B60T 7/12; B60T 2201/00; B60T 2201/02; B60T 2201/022; B60T 2201/024; B60T 2201/03; B60T 2201/08; B60T 2201/089; B60T 2210/00; B60T 2210/10; B60T 2710/18; G05D 1/00; G05D 1/02; G05D 1/021; G05D 1/0289
USPC .......................................................... 701/70
See application file for complete search history.

FIG. 6

DRIVING SUPPORT APPARATUS

CROSS-REFERENCE TO RELATED APPLICATIONS

This application is based upon and claims the benefit of priority of the prior Japanese Patent Application No. 2018-035212, filed on Feb. 28, 2018, the entire contents of which are incorporated herein by reference.

BACKGROUND

1. Technical Field

Embodiments of the present disclosure relate to a driving support apparatus, and particularly relate to a driving support apparatus configured to support deceleration of a vehicle, for example, when a red light or the like is recognized.

2. Description of the Related Art

For a technology/technique used in this type of apparatus, for example, there is proposed a method of recognizing a traffic light by using a camera mounted on a vehicle and of calculating a distance from the vehicle to the traffic light on the basis of image data of the camera. In the method, in the case of a red light, a position at which the vehicle is to be stopped is determined in such a manner that the traffic light remains in a visual field area of the camera, and a driver of the vehicle is notified of the determined position, and automatic deceleration is further performed (refer to Japanese Translation of PCT International Application No. 2016-501408 (Patent Literature 1)).

The technology/technique disclosed in the Patent Literature 1 does not take into account measures to be taken if the red light is no longer recognized when the vehicle is automatically decelerated due to the red light, which is technically problematic.

In view of the aforementioned problems, it is therefore an object of embodiments of the present disclosure to provide a driving support apparatus that can appropriately perform a driving support, even if a target that requires deceleration of a host vehicle, such as, for example, a red light, is no longer recognized when supporting the deceleration of the host vehicle due to the recognition of the target.

The above object of embodiments of the present disclosure can be achieved by a driving support apparatus provided with: a recognizer configured to obtain information indicating a surrounding environment of a host vehicle, and configured to recognize a deceleration required target, which is a target that requires deceleration of the host vehicle; and a supporter configured to perform a driving support operation for supporting the deceleration of the host vehicle, on condition that the deceleration required target is recognized by said recognizer, wherein if a recognition situation, which is recognized by said recognizer, of the deceleration required target that causes the driving support operation to be performed becomes uncertain while performing the driving support operation, said supporter is configured to maintain a preceding operating state of the driving support operation, which is an operating state immediately before the recognition situation becomes uncertain.

DETAILED DESCRIPTION OF THE EMBODIMENTS

A driving support apparatus according to embodiments of the present disclosure will be explained with reference to the drawings.

First Embodiment

A driving support apparatus according to a first embodiment will be explained with reference to FIG. 1 and FIG. 2.

(Configuration)

A configuration of the driving support apparatus according to the first embodiment will be explained with reference to FIG. 1. FIG. 1 is a block diagram illustrating the configuration of the driving support apparatus according to the first embodiment.

Figure 1:
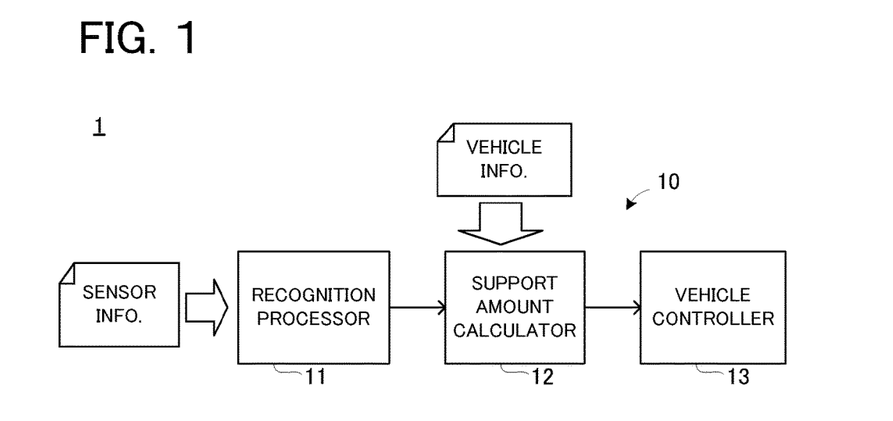
FIG. 1 is a block diagram illustrating a configuration of a driving support apparatus according to a first embodiment.

In FIG. 1, a driving support apparatus 10 is mounted on a vehicle 1. The driving support apparatus 10 is provided with a recognition processor 11, a support amount calculator 12, and a vehicle controller 13.

The recognition processor 11 is configured to obtain sensor information indicating a surrounding environment of the vehicle 1. Specific examples of the sensor information are (i) images taken by a camera mounted on the vehicle 1 (or a so-called in-vehicle camera), (ii) output information from a laser sensor, a radar sensor, an ultrasonic wave sensor, or the like, (iii) information obtained via a communication network, such as, for example, the Internet, (iv) information obtained via a beacon, road-vehicle communication, or the like (or information obtained by a so-called infrastructure cooperation system), and so on.

The recognition processor 11 is configured to recognize a deceleration required target, which is a target that requires deceleration of the vehicle 1, from the surrounding environment of the vehicle 1 indicated by the sensor information. Various existing aspects can be applied to a technology/technique of recognizing a particular target (which is the deceleration required target herein) from the sensor information, and a detailed explanation of the technology/technique will be thus omitted.

The deceleration required target may include, for example, a traffic light, a pedestrian crossing, a railroad crossing, a temporary stop sign, a temporary stop mark, and so on. For example, in some cases, the traffic light and the pedestrian crossing do not correspond to the deceleration required target depending on their states. In the case of the traffic light, if its light color is red, the traffic light corresponds to the deceleration required target, but if the light color is green, the traffic light does not correspond to the deceleration required target. In the case of the pedestrian crossing, if there are a pedestrian and a cyclist that cross the pedestrian crossing, the pedestrian crossing corresponds to the deceleration required target, but if there is no pedestrian and no cyclist that cross the pedestrian crossing, the traffic light does not correspond to the deceleration required target. On the other hand, for example, the temporary stop sign and the temporary stop mark always correspond to the deceleration required target.

The railroad crossing may be treated differently depending on a region. For example, in Japan, in principle, the railroad crossing corresponds to the deceleration required target. However, for example, a railroad crossing that allows passing without stopping immediately before itself in accordance with a signal indicated by the traffic light may be not the deceleration required target. For example, in the US and Europe or the like, in some cases, the railroad crossing does not correspond to the deceleration required target depending on its state. In other words, if a crossing alarm and/or a crossing gate of the railroad crossing are operating, the railroad crossing corresponds to the deceleration required target; however, if the crossing alarm and the crossing gate of the railroad crossing are not operating, the railroad crossing does not correspond to the deceleration required target.

In the first embodiment, a stop line (mark) and a stop line sign are not treated as the deceleration required target. This is because the stop line and the stop line sign merely indicate a stop position when the vehicle is stopped, and whether the vehicle is stopped or not is determined, for example, by the light color of the traffic light, the temporary stop sign, or the like, which is different from the stop line and the stop line sign.

The support amount calculator 12 is configured to calculate a support amount associated with a deceleration support control for automatically decelerating the vehicle 1, on the basis of vehicle information indicating a state of the vehicle 1, on condition that the deceleration required target is recognized by the recognition processor 11. The vehicle information may include output information, for example, from a vehicle speed sensor, a vehicle wheel speed sensor, an acceleration sensor, a yaw rate sensor, a steering angle sensor, and so on. Various existing aspects can be applied to a method of calculating the support amount, and a detailed explanation of the method will be thus omitted.

The vehicle controller 13 is configured to control various actuators, such as, for example, a brake actuator and a throttle actuator, which are mounted on the vehicle 1, on the basis of the support amount calculated by the support amount calculator 12.

(Control Process)

Next, the deceleration support control performed by the driving support apparatus 10 configured in the above manner will be explained with reference to a flowchart in FIG. 2. In FIG. 2, an object whose state varies, such as, for example, the traffic light and the pedestrian crossing, shall be recognized as the deceleration required target. Particularly in the first embodiment, an explanation will be given to a control process when the deceleration required target becomes uncertain while the deceleration support control is performed.

Here, the term "uncertain" may mean a situation in which the recognition processor 11 cannot recognize the deceleration required target, and a situation in which the recognition processor 1 cannot specify the state of the deceleration required target (i.e., when the deceleration required target is an object whose state varies, such as, for example, the traffic light). The reason why the deceleration required target becomes uncertain while the deceleration support control is performed, may be, for example, (i) that the vehicle 1 approaches the deceleration required target and the deceleration required target goes outside an imaging range of the camera, (ii) a relatively large preceding vehicle, such as a truck, and a wiper blade (in wiper operation) or the like hide the deceleration required target, (iii) communication is interrupted when the sensor information is obtained by communication with an apparatus outside the vehicle 1, and so on.

Figure 2:
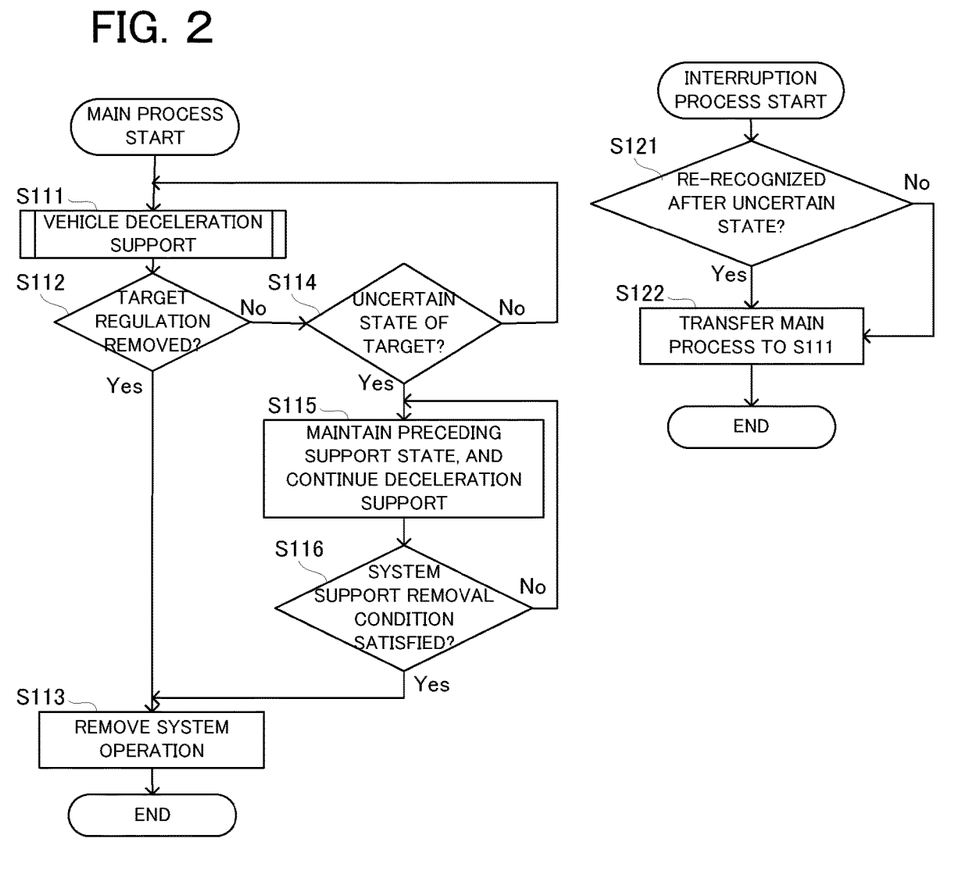
FIG. 2 is a flowchart illustrating a control process according to the first embodiment.

In a main process in FIG. 2, the deceleration required target is recognized by the recognition processor 11, by which the deceleration support control is performed (step S111). At this time, the support amount calculator 12 may set a stop target position when calculating the support amount, on the basis of the recognized deceleration required target.

Then, the recognition processor 11 determines whether or not a regulation by the deceleration required target is removed on the basis of the sensor information (step S112). Here, the "regulation by the deceleration required target" may mean, for example, "stop" by the traffic light having a red light color, "stop" by the pedestrian crossing on which the pedestrian or the like is crossing, or the like. The "removal of the regulation by the deceleration required target" may mean, for example, that the light color of the traffic light has changed from red to green, that there is no longer any pedestrian or the like who is crossing, or the like.

In the step S112, if it is determined that the regulation by the deceleration required target is removed (the step S112: Yes), the deceleration support control is removed (step S113). On the other hand, in the step S112, if it is determined that the regulation by the deceleration required target is not removed (the step S112: No), the recognition processor 11 determines whether or not the deceleration required target is uncertain (step S114).

In the step S114, if it is determined that the deceleration required target is not uncertain, i.e., if it is determined that deceleration required target is recognized (the step S114: No), the step S111 is performed, i.e., the deceleration support control is maintained. On the other hand, in the step S114, if it is determined that the deceleration required target is uncertain (the step S114: Yes), the support amount calculator 12 may maintain a preceding support state, which is namely a support amount calculated immediately before it is determined that the deceleration required target is uncertain, out of support amounts repeatedly calculated with a predetermined period on the basis of the vehicle information that momentarily changes. The vehicle controller 13 controls the various actuators mounted on the vehicle 1, on the basis of the support amount outputted from the support amount calculator 12, by which the deceleration support control with the preceding support state maintained is continued (step S115).

Then, the driving support apparatus 10 determines whether or not a system support removal condition is satisfied (step S116). Here, the system support removal condition may be, for example, (i) that a predetermined time elapses after it is determined that the deceleration required target is uncertain, (ii) that a moving distance of the vehicle 1 after it is determined that the deceleration required target is uncertain reaches a predetermined distance, (iii) that a speed of the vehicle 1 falls under a predetermined threshold value, (iv) that the vehicle 1 reaches a target position, (v) a driver of the vehicle 1 performs an operation of an accelerator pedal or a brake pedal, and so on. The system support removal condition may include only one requirement, or may include a plurality of requirements.

In the step S116, if it is determined that the system support removal condition is satisfied (the step S116: Yes), the deceleration support control is removed (the step S113). On the other hand, in the step S116, if it is determined that the system support removal condition is not satisfied (the step S116: No), the step S115 is performed again.

In the step S114, if it is determined that the deceleration required target is uncertain, an interruption process is performed in parallel with the main process. In the interruption process, the recognition processor 11 determines whether or not the deceleration required target is re-recognized, after determining that the deceleration required target is uncertain (step S121).

In the step S121, if it is determined that the deceleration required target is re-recognized (the step S121: Yes), the main process is transferred to the step S111 (step S122). On the other hand, in the step S121, if it is determined that the deceleration required target is not re-recognized (the step S121: No), the process is temporarily ended, and the step S121 is performed again after a lapse of a predetermined period (e.g., several ten milliseconds to several hundred milliseconds).

(Technical Effect)

If the deceleration support control is immediately removed when the deceleration required target becomes uncertain, or if the deceleration required target is re-recognized and the deceleration support control is performed again after the deceleration required target becomes uncertain and the deceleration support control is removed, then, vehicle behavior possibly becomes unstable.

On the driving support apparatus 10, even if the deceleration required target becomes uncertain, the preceding support state is maintained and the deceleration support control is continued. In this case, the deceleration support control is continued until the system support removal condition is satisfied. In other words, on the driving support apparatus 10, even if the deceleration required target becomes uncertain, the deceleration support control is continued until the deceleration support control can be removed, i.e., until the system support removal condition is satisfied.

As described above, according to the driving support apparatus 10, even if the deceleration required target becomes uncertain, the deceleration support control is continued, and it is thus possible to prevent the behavior of the vehicle 1 from being unstable. In other words, according to the driving support apparatus 10, even if the deceleration required target becomes uncertain, the driving support is continued, and the vehicle 1 can be appropriately controlled.

First Modified Example

A first modified example of the driving support apparatus according to the first embodiment will be explained with reference to FIG. 3. On the driving support apparatus 10 according to the first modified example, the support amount calculator 12 may set the stop target position on the basis of a target that is different from the deceleration required target recognized by the recognition processor 11. Specifically, the support amount calculator 12 may set the stop target position, for example, on the basis of a stop line, a preceding vehicle, or the like.

Figure 3:
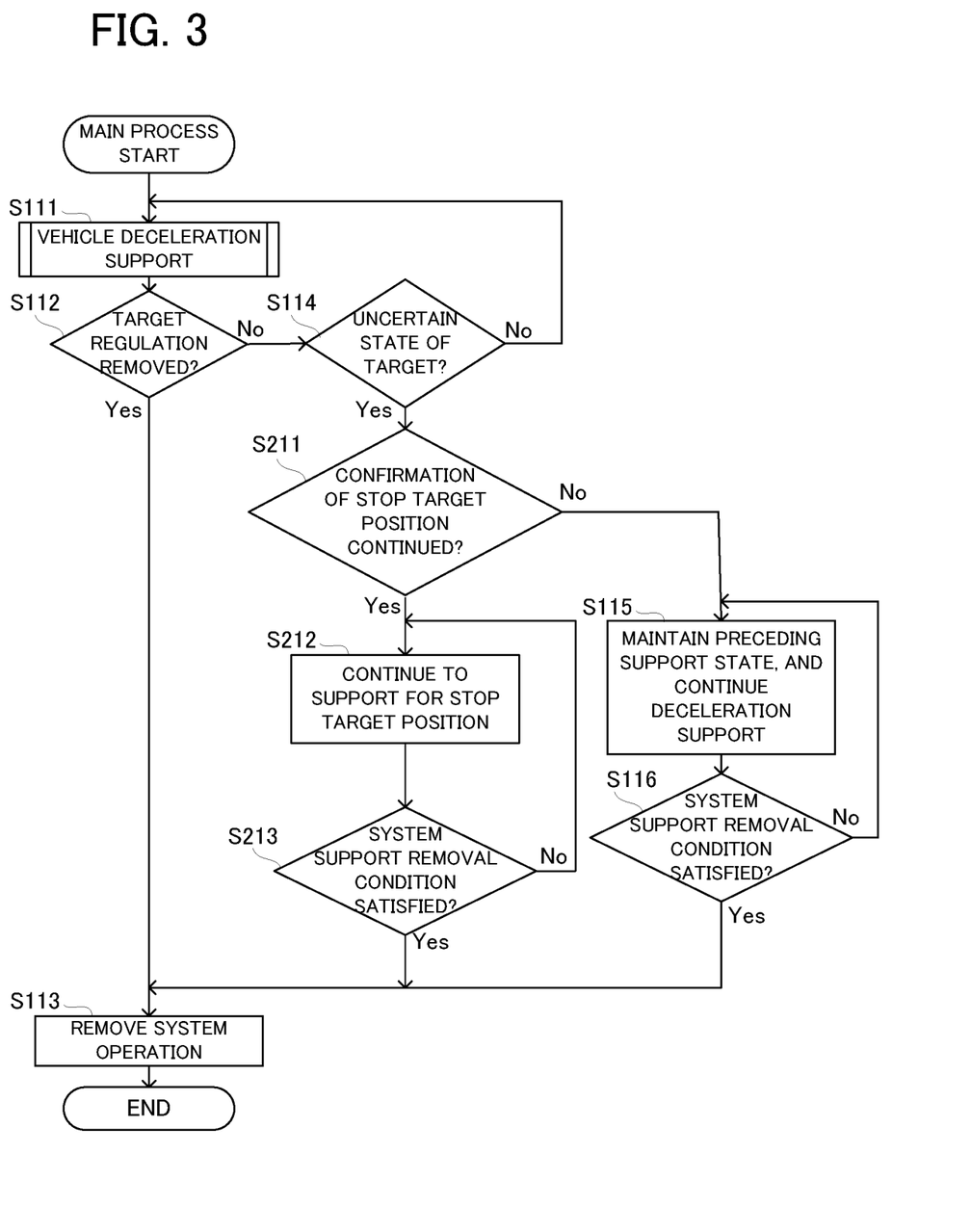
FIG. 3 is a flowchart illustrating a control process according to a first modified example.

In the step S114 in FIG. 3, if it is determined that the deceleration required target is uncertain (the step S114: Yes), the recognition processor 11 determines whether or not the confirmation of the stop target position, i.e., the recognition, is continued (step S211). In the step S211, if it is determined that the confirmation of the stop target position is not continued (the step S211: No), the process after the step S115 described above is performed.

On the other hand, in the step S211, if it is determined that the confirmation of the stop target position is continued (the step S211: Yes), the support amount calculator 12 may calculate the support amount on the basis of the stop target position and the vehicle information. The vehicle controller 13 controls the various actuators mounted on the vehicle 1, on the basis of the support amount outputted from the support amount calculator 12, by which the deceleration support control for the stop target position is continued (step S212).

Then, the driving support apparatus 10 determines whether or not the system support removal condition is satisfied (step S213). In the step S213, if it is determined that the system support removal condition is satisfied (the step S213: Yes), the deceleration support control is removed (the step S113). On the other hand, in the step S213, if it is determined that the system support removal condition is not satisfied (the step S213: No), the step S212 is performed again.

Second Modified Example

A second modified example of the driving support apparatus according to the first embodiment will be explained. On the driving support apparatus 10 according to the second modified example, the stop target position when the support amount is calculated by the support amount calculator 12 on the basis of the deceleration required target is set, as in the aforementioned first embodiment, until it is determined that the deceleration required target is uncertain in the step S114.

In the step S114 described above, if it is determined that the deceleration required target is uncertain (the step S114: Yes), the support amount calculator 12 may try to estimate the stop target position, for example, on the basis of the position of the deceleration required target that is recognized immediately before it is determined that the deceleration required target is uncertain. Various existing aspects, such as, for example, extrapolation, can be applied to a method of estimating the stop target position, and a detailed explanation of the method will be thus omitted.

If the support amount calculator 12 can estimate the stop target position, the support amount calculator 12 may calculate the support amount on the basis of the estimated stop target position and the vehicle information. The vehicle controller 13 controls the various actuators mounted on the vehicle 1, on the basis of the support amount outputted from the support amount calculator 12, by which the deceleration support control for the estimated stop target position is performed. On the other hand, if the support amount calculator 12 cannot estimate the stop target position, the process after the step S115 described above is performed.

Third Modified Example

A third modified example of the driving support apparatus according to the first embodiment will be explained with reference to FIG. 4. On the driving support apparatus 10 according to the third modified example, an object whose state does not vary, such as, for example, the temporary stop sign and the temporary stop mark, shall be recognized as the deceleration required target. Thus, in the third modified example, the step S112 described above is not performed. This is because the regulation by the deceleration required target will never be removed.

Figure 4:
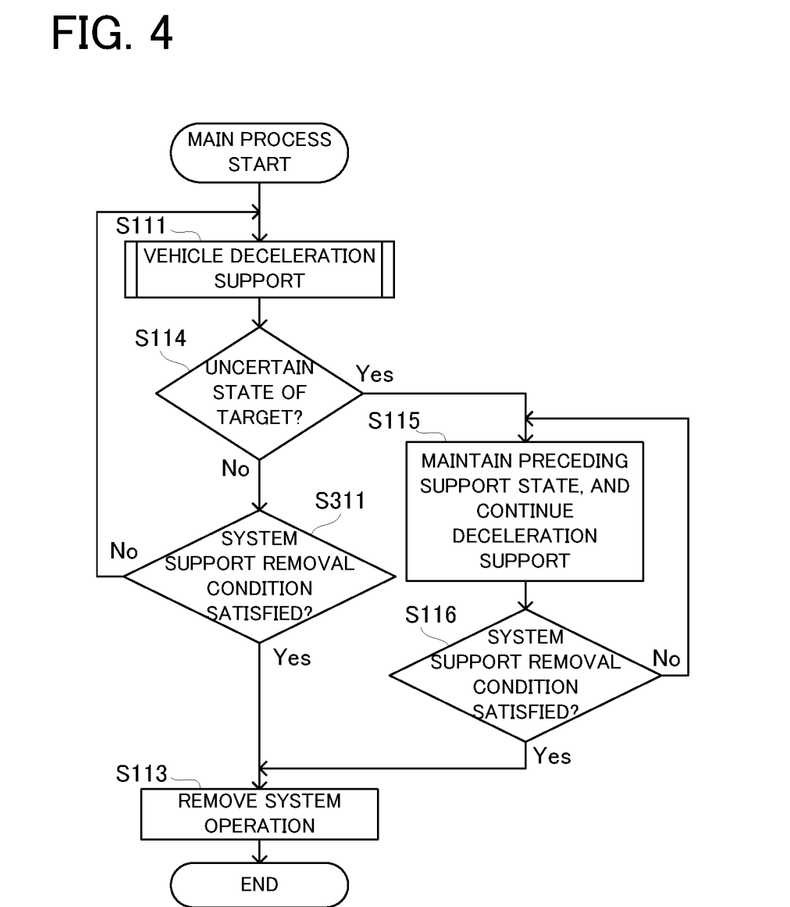
FIG. 4 is a flowchart illustrating a control process according to a third modified example.

In the step S114 in FIG. 4, if it is determined that the deceleration required target is not uncertain (the step S114: No), the driving support apparatus 10 determines whether or not the system support removal condition is satisfied (step S311). In the step S311, if it is determined that the system support removal condition is satisfied (the step S311: Yes), the deceleration support control is removed (the step S113). On the other hand, in the step S311, if it is determined that the system support removal condition is not satisfied (the step S311: No), the step S111 is performed again.

Fourth Modified Example

A fourth modified example of the driving support apparatus according to the first embodiment will be explained with reference to FIG. 5. In the fourth modified example, as in the aforementioned third modified example, an object whose state does not vary, such as, for example, the temporary stop sign and the temporary stop mark, shall be recognized as the deceleration required target. Thus, even in the fourth modified example, the step S112 described above is not performed. Moreover, in the fourth modified example, as in the aforementioned first modified example, the support amount calculator 12 may set the stop target position, on the basis of a target that is different from the deceleration required target recognized by the recognition processor 11.

Figure 5:
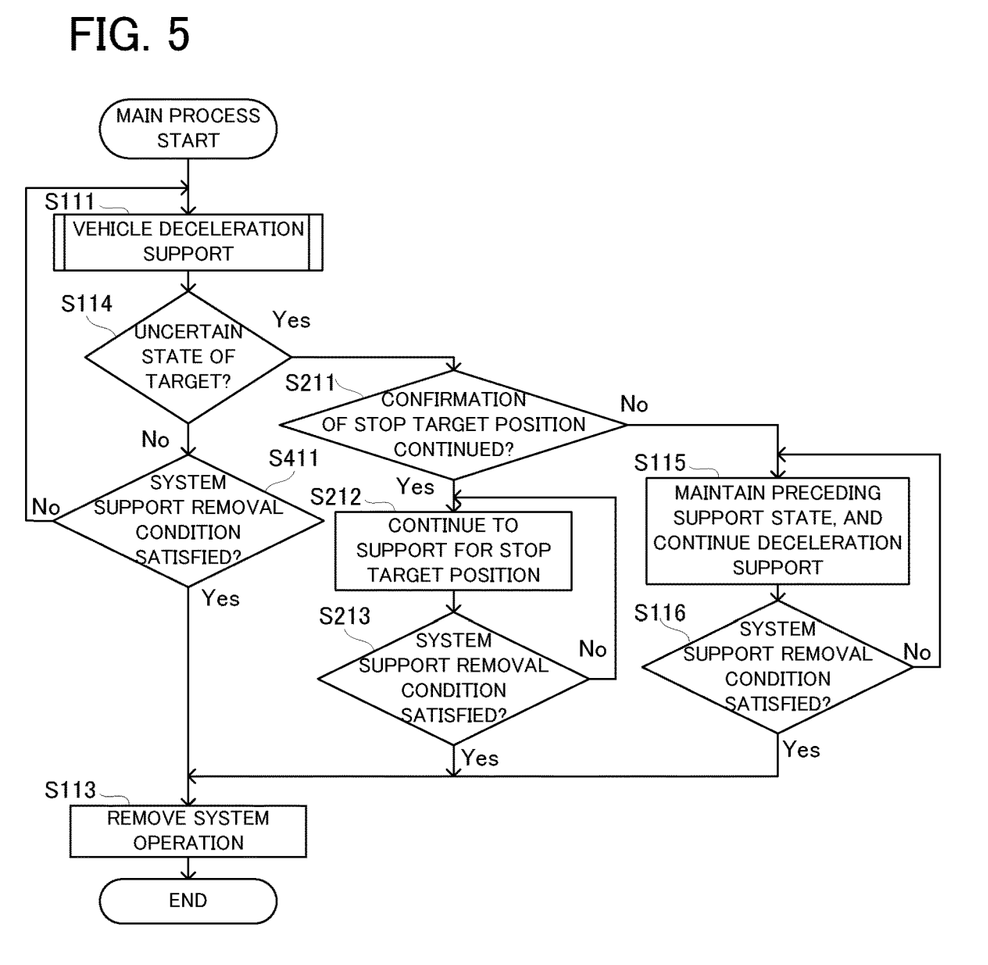
FIG. 5 is a flowchart illustrating a control process according to a fourth modified example.

In the step S114 in FIG. 5, if it is determined that the deceleration required target is not uncertain (the step S114: No), the driving support apparatus 10 determines whether or not the system support removal condition is satisfied (step S411). In the step S411, if it is determined that the system support removal condition is satisfied (the step S411: Yes), the deceleration support control is removed (the step S113). On the other hand, in the step S411, if it is determined that the system support removal condition is not satisfied (the step S411: No), the step S111 is performed again.

The first embodiment and the first to fourth modified examples described above may be combined, as occasion demands. Moreover, in addition to the deceleration support control, the driver of the vehicle 1 may be notified of the presence of the deceleration required target ahead in a moving direction of the vehicle 1.

Second Embodiment

A driving support apparatus according to a second embodiment will be explained with reference to FIG. 6. The second embodiment is the same as the aforementioned first embodiment, except that a notification support control for notifying the driver of the vehicle of information related to the deceleration required target is performed, instead of the deceleration support control. Thus, in the second embodiment, the same explanation as that in the first embodiment will be omitted, and the same parts on the drawing will carry the same reference numerals. Only a basically different point will be explained with reference to FIG. 6.

(Configuration) A configuration of the driving support apparatus according to the second embodiment will be explained with reference to FIG. 6. FIG. 6 is a block diagram illustrating the configuration of the driving support apparatus according to the second embodiment.

Figure 6:
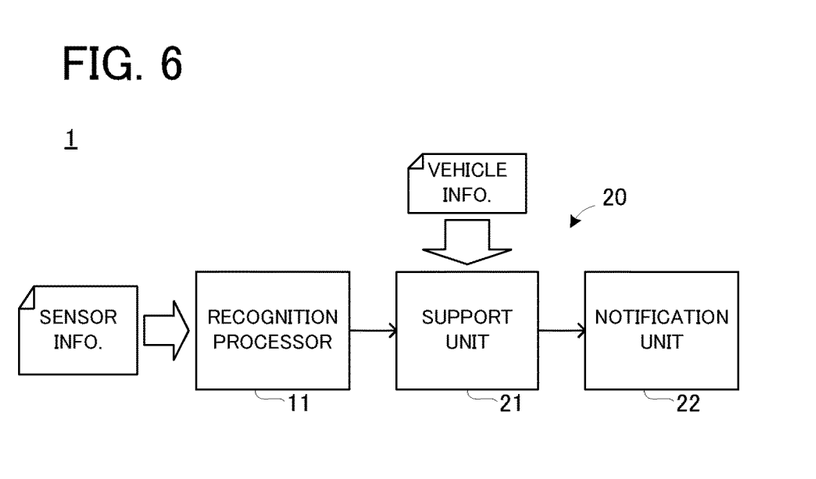
FIG. 6 is a block diagram illustrating a configuration of a driving support apparatus according to a second embodiment.

In FIG. 6, a driving support apparatus 20 is provided with the recognition processor 11, a support unit 21, and a notification unit 22. The support unit 21 is configured to generate the information related to the deceleration required target, on condition that the deceleration required target is recognized by the recognition processor 11. The support unit 21 is configured to notify the driver of the vehicle 1 of the generated information via the notification unit 22, such as, for example, a display and a speaker.

The "information related to the deceleration required target" may include, for example, information indicating the deceleration required target itself, information indicating the state of the deceleration required target (e.g., the light color of the traffic light, etc.), information indicating a distance from the vehicle 1 to the deceleration required target, information indicating a position of the stop line corresponding to the deceleration required target, and so on. The information indicating the distance from the vehicle 1 to the deceleration required target may be obtained, for example, on the basis of the vehicle information.

(Control Process)

Next, the notification support control performed by the driving support apparatus 20 configured in the above manner will be explained by applying the flowchart in FIG. 2. In FIG. 2, the "(vehicle) deceleration support" shall be read as "notification support".

In the main process in FIG. 2, the deceleration required target is recognized by the recognition processor 11, by which the notification support control is performed (step S111). At this time, the support unit 21 may generate information related to the recognized deceleration required target and may notify the driver of the vehicle 1 of the generated information via the notification unit 22.

Then, the recognition processor 11 determines whether or not the regulation by the deceleration required target is removed on the basis of the sensor information (step S112). In the step S112, if it is determined that the regulation by the deceleration required target is removed (the step S112: Yes), the notification support control is removed (step S113). Thus, for example, if a green light is confirmed, i.e., if the red light is changed to the green light, the notification of the information related to the deceleration required target, which is the red light in this case, is immediately stopped.

On the other hand, in the step S112, if it is determined that the regulation by the deceleration required target is not removed (the step S112: No), the recognition processor 11 determines whether or not the deceleration required target is uncertain (step S114).

In the step S114, if it is determined that the deceleration required target is not uncertain, i.e., if it is determined that deceleration required target is recognized (the step S114: No), the step S111 is performed, i.e., the notification support control is maintained. On the other hand, in the step S114, if it is determined that the deceleration required target is uncertain (the step S114: Yes), the support unit 21 maintains the notification of the information generated immediately before it is determined that the deceleration required target is uncertain (step S115).

If the driver is notified of the information indicating the distance from the vehicle 1 to the deceleration required target, the support unit 21 may update the information indicating the distance, on the basis of the vehicle information and the information generated immediately before it is determined that the deceleration required target is uncertain (i.e., the distance).

Then, the driving support apparatus 10 determines whether or not the system support removal condition is satisfied (step S116). In the step S116, if it is determined that the system support removal condition is satisfied (the step S116: Yes), the notification support control is removed (the step S113). On the other hand, in the step S116, if it is determined that the system support removal condition is not satisfied (the step S116: No), the step S115 is performed again.

(Technical Effect)

On the driving support apparatus 20, even if the deceleration required target becomes uncertain, the notification support control is continued until the notification support control can be removed, i.e., until the system support removal condition is satisfied. When the driver who is performing a deceleration operation due to the red light, which is an example of the deceleration required target, is notified of the information related to the red light, if the notification of the information is ended because the deceleration required target becomes uncertain, then, the driver possibly feels discomfort. On the driving support apparatus 20, however, the notification support control is continued even if deceleration required target becomes uncertain. It is thus possible to prevent the driver from feeling discomfort. In other words, according to the driving support apparatus 20, it is possible to appropriately perform the driving support even if the deceleration required target becomes uncertain.

The driving support apparatus 20 according to the second embodiment can also adopt the same aspects as the first to fourth modified examples associated with the first embodiment described above. Even in this case, the "deceleration support" shall be read as the "notification support". Moreover, in addition to the notification support control, the deceleration support control according to the first embodiment described above may be performed.

Various aspects of the embodiments of the present disclosure derived from the embodiments and modified examples explained above will be explained hereinafter.

A driving support apparatus according to an aspect of embodiments of the present disclosure is provided with: a recognizer configured to obtain information indicating a surrounding environment of a host vehicle, and configured to recognize a deceleration required target, which is a target that requires deceleration of the host vehicle; and a supporter configured to perform a driving support operation for supporting the deceleration of the host vehicle, on condition that the deceleration required target is recognized by said recognizer, wherein if a recognition situation, which is recognized by said recognizer, of the deceleration required target that causes the driving support operation to be performed becomes uncertain while performing the driving support operation, said supporter is configured to maintain a preceding operating state of the driving support operation, which is an operating state immediately before the recognition situation becomes uncertain.

The "recognition processor 11" in the first embodiment corresponds to an example of the "recognizer", and the "support amount calculator 12" and the "vehicle controller 13" correspond to an example of the "supporter". The "support unit 21" in the second embodiment corresponds to an example of the "supporter". The "deceleration support control" in the first embodiment and the "notification support control" in the second embodiment correspond to an example of the "driving support operation".

On the driving support apparatus, if the recognition situation, which is recognized by the recognizer, of the deceleration required target that causes the driving support operation to be performed becomes uncertain while performing the driving support operation, the preceding operating state of the driving support operation, which is the operating state immediately before the recognition situation of the deceleration required target becomes uncertain, is maintained by the supporter. Thus, according to the driving support apparatus, it is possible to appropriately perform the driving support even if the deceleration required target is no longer recognized while the driving support operation is performed.

In an aspect of the driving support apparatus, the supporter is configured to end the driving support operation on condition that a predetermined removal condition associated with the driving support operation is satisfied, after maintaining the preceding operating state if the recognition situation becomes uncertain while performing the driving support operation. According to this aspect, it is possible to appropriately end the driving support operation if the recognition situation of the deceleration required target becomes uncertain.

In another aspect of the driving support apparatus, the supporter is configured to perform the driving support operation by setting a stop target position corresponding to the recognized deceleration required target on condition that the deceleration required target is recognized by said recognizer, and if the recognition situation becomes uncertain while performing the driving support operation, the supporter is configured (i) to continue the driving support operation on the basis of the stop target position if the stop target position is recognized, and (ii) to maintain the preceding operating state, which is the operating state immediately before the recognition situation becomes uncertain if the stop target position is not recognized.

According to this aspect, even if the recognition situation of the deceleration required target becomes uncertain, if the stop target position corresponding to the deceleration required target is recognized, the driving support operation is continued on the basis of the stop target position. If the recognition situation of the deceleration required target becomes uncertain and if the stop target position is not recognized, then, the preceding operating state of the driving support operation, which is the operating state immediately before the recognition situation of the deceleration required target becomes uncertain, is maintained by the supporter. According to this aspect, it is possible to appropriately perform the driving support even if the deceleration required target is no longer recognized while the driving support operation is performed.

Alternatively, in another aspect of the driving support apparatus, if the recognition situation becomes uncertain while performing the driving support operation and if the stop target position of the host vehicle can be estimated on the basis of a preceding recognition situation, which is the recognition situation immediately before the recognition situation becomes uncertain, then, the supporter is configured to continue the driving support operation on the basis of the estimated stop target position. According to this aspect, it is possible to continue the driving support operation even if the recognition situation of the deceleration required target becomes uncertain, which is extremely useful in practice.

In another aspect of the driving support apparatus, the driving support operation includes a braking support control for automatically decelerating the host vehicle. According to this aspect, the host vehicle can be automatically decelerated as the driving support operation.

In another aspect of the driving support apparatus, the driving support operation includes a notification control for notifying a driver of the host vehicle of information related to the deceleration required target. According to this aspect, the driver can be notified of the information related to the deceleration required target as the driving support operation.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving support apparatus comprising:
a recognizer configured to obtain information indicating a surrounding environment of a host vehicle, and configured to recognize a deceleration required target and a state thereof, the deceleration required target being a target that requires deceleration of the host vehicle; and
a supporter configured to perform a driving support operation for supporting the deceleration of the host vehicle, on a condition that the deceleration required target is recognized by said recognizer, wherein
said supporter is further configured to maintain a preceding operating state of the driving support operation, when the recognizer does not recognize the deceleration required target or the state of the deceleration required target, while the driving support operation is being performed, the preceding operating state of the driving support operation being an operating state immediately before the recognizer does not recognize the deceleration required target or the state of the deceleration required target.

2. A driving support apparatus according to claim 1, wherein the driving support operation includes a notification control for notifying a driver of the host vehicle of information related to the deceleration required target.

3. A driving support apparatus according to claim 1, wherein said supporter is further configured to end the driving support operation on a condition that a predetermined driving support operation removal condition is satisfied, after maintaining the preceding operating state when the recognizer does not recognize the deceleration required target or the state of the deceleration required target, while the driving support operation is being performed.

4. A driving support apparatus according to claim 3, wherein
said supporter is further configured to perform the driving support operation by setting a stop target position corresponding to the recognized deceleration required target on a condition that the deceleration required target is recognized by said recognizer, and
when the recognizer does not recognize the deceleration required target or the state of the deceleration required target, while the driving support operation is being performed, said supporter is further configured (i) to maintain the driving support operation on the basis of the stop target position when the stop target position is recognized, and (ii) to continue the preceding operating state, which is the operating state immediately before the recognizer does not recognize the deceleration required target or the state of the deceleration required target, when the stop target position is not recognized.

5. A driving support apparatus according to claim 3, wherein said supporter is further configured such that when the recognizer does not recognize the deceleration required target or the state of the deceleration required target while the driving support operation is being performed, and when the stop target position of the host vehicle can be estimated on the basis of a preceding recognition situation, which is the recognition situation immediately before the recognizer does not recognize the deceleration required target or the state of the deceleration required target, said supporter continues the driving support operation on the basis of the estimated stop target position.

6. A driving support apparatus according to claim 3, wherein the driving support operation includes a braking support control for automatically decelerating the host vehicle.

7. A driving support apparatus according to claim 3, wherein the driving support operation includes a notification control for notifying a driver of the host vehicle of information related to the deceleration required target.

8. A driving support apparatus according to claim 1, wherein
said supporter is further configured to perform the driving support operation by setting a stop target position corresponding to the recognized deceleration required target on a condition that the deceleration required target is recognized by said recognizer, and
when the recognizer does not recognize the deceleration required target or the state of the deceleration required target while the driving support operation is being performed, said supporter is further configured (i) to maintain the driving support operation on the basis of the stop target position when the stop target position is recognized, and (ii) to continue the preceding operating state, which is the operating state immediately before the recognizer does not recognize the deceleration required target or the state of the deceleration required target, when the stop target position is not recognized.

9. A driving support apparatus according to claim 8, wherein the driving support operation includes a braking support control for automatically decelerating the host vehicle.

10. A driving support apparatus according to claim 8, wherein the driving support operation includes a notification control for notifying a driver of the host vehicle of information related to the deceleration required target.

11. A driving support apparatus according to claim 1, wherein said supporter is further configured such that when the recognizer does not recognize the deceleration required target or the state of the deceleration required target, while the driving support operation is being performed, and when a stop target position of the host vehicle can be estimated on the basis of a preceding recognition situation, which is a recognition situation immediately before the recognizer does not recognize the deceleration required target or the state of the deceleration required target, said supporter continues the driving support operation on the basis of the estimated stop target position.

12. A driving support apparatus according to claim 11, wherein the driving support operation includes a braking support control for automatically decelerating the host vehicle.

13. A driving support apparatus according to claim 11, wherein the driving support operation includes a notification control for notifying a driver of the host vehicle of information related to the deceleration required target.

14. A driving support apparatus according to claim 1, wherein the driving support operation includes a braking support control for automatically decelerating the host vehicle.

15. A driving support apparatus according to claim 14, wherein the driving support operation includes a notification control for notifying a driver of the host vehicle of information related to the deceleration required target.

* * * * *